United States Patent Office 2,885,164
Patented May 5, 1959

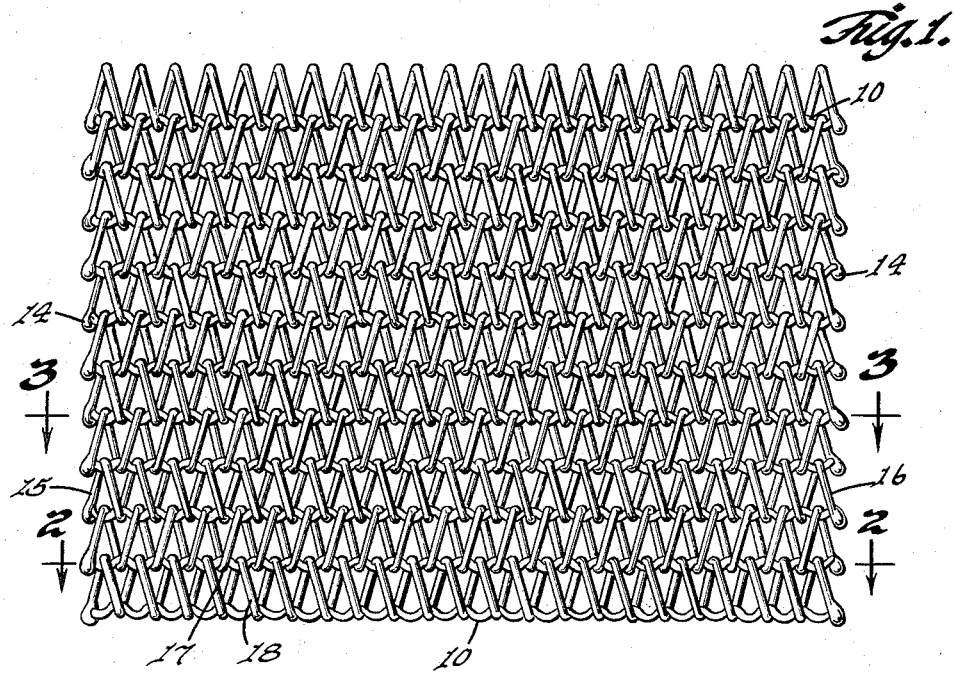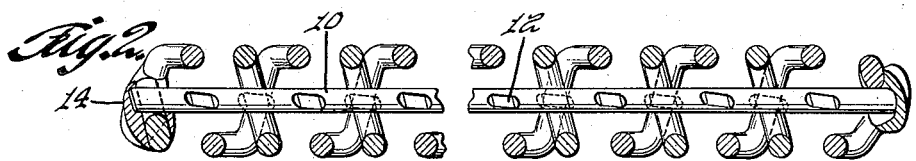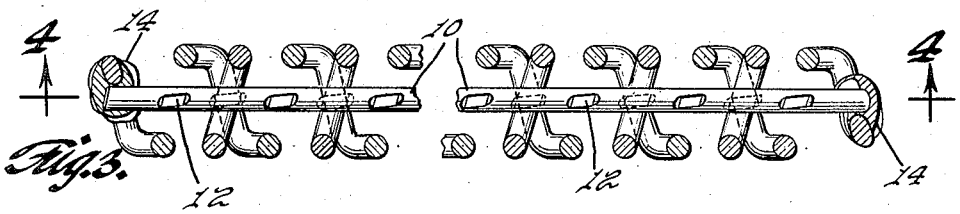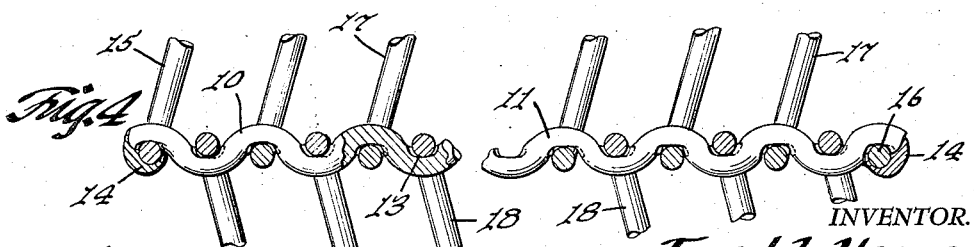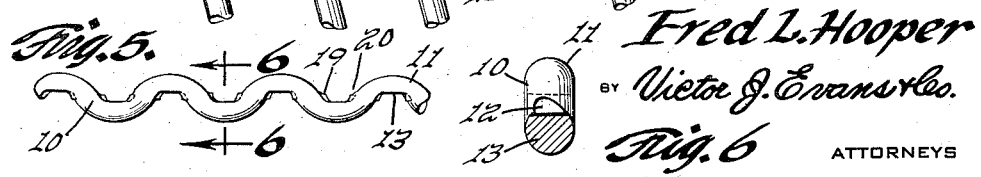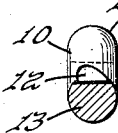
INVENTOR.
Fred L. Hooper
BY Victor J. Evans & Co.
ATTORNEYS

2,885,164

CRIMPED CONNECTING BARS FOR WOVEN WIRE CONVEYOR BELT

Fred L. Hooper, Cambridge, Md., assignor to Cambridge Wire Cloth Company, Cambridge, Md.

Application March 18, 1955, Serial No. 495,297

1 Claim. (Cl. 245—6)

This invention relates to woven wire fabric such as used in conveyor belts with convolutions of flat coils retained in assembled relation with transversely disposed crimped connecting bars, and in particular a woven wire conveyor belt having crimped connecting bars with the tooth markings in the bottoms of the crimps providing bearing surfaces of the connecting bars offset approximately to the same angle as the helical angle of the spiral whereby the convolutions nest in the bottoms of crimped sections and are retained therein by tension in the belt preventing the wires riding upwardly on the inclined portions of the crimped sections of the connecting bars.

The purpose of this invention is to provide means for forming crimped connecting wires of woven wire conveyor belts or other wire fabric whereby alternate portions of crimped sections of the connecting wires include tooth marks to correspond approximately with the angle of the convolutions or spirals.

Connecting wires of woven wire conveyor belts have been crimped to correspond with convolutions of the spirals or coils, however, with the section of a convolution on one side of the belt positioned at an acute angle to the longitudinal direction of the belt and the section on the opposite side positioned to the same angle but in the opposite direction a V is formed in each convolution and with the surfaces of the sections of the convolutions bearing against side surfaces of the crimped wire the vertex of a convolution is in spaced relation to the bottom of the crimp and as wear develops with use of the belt the vertexes of the convolutions work into the bottoms of the crimps causing the length of the belt to be increased. With this thought in mind, this invention contemplates providing tooth marks in the sections of the crimps of the connecting wires of a woven wire conveyor belt or other wire fabric whereby the vertexes of the convolutions of the spirals are adapted to nest in the tooth marks in the bottoms of the crimps.

Furthermore, with the crimp formed in a common plane, the vertexes of the convolutions of the spirals or coils have a tendency to ride upwardly on inclined surfaces of portions of the crimps of the connecting wires whereby a belt with a conventional crimp travels laterally and with relatively long belts, such as used in cracker ovens, it is difficult to retain the belt in alignment with the pulleys at the ends. With tooth marks of the crimps offset substantially to the angle of the convolutions whereby the vertexes of the convolutions nest in the bottoms of the crimps the tendency for lateral movement of the belt is eliminated.

The object of this invention is, therefore, to provide means for forming crimped connecting bars of woven wire conveyor belts or other wire fabric whereby accurate alignment of spiral members of the belt is obtained.

Another object of the invention is to provide crimped connecting bars for woven wire fabric in which substantially even distribution of tension on both spiral members and connecting bars is obtained.

Another important object of the invention is to provide an improved crimped connecting bar for woven wire conveyor belts and the like wherein wear on both the spiral members and crimped connecting bars is reduced to a minimum.

Another important object of the invention is to provide improved crimped connecting bars for woven wire conveyor belts or other woven wire materials in which the elimination of wedge effect of spiral members on the crimped connecting bars is obtained and the concentrated stresses in the crimped connecting bars are reduced to a minimum.

A further object of the invention is to provide crimped connecting bars for woven wire conveyor belts in which vibrations resulting from jumping in the spirals of belts of this type are eliminated.

A still further object is to provide crimped connecting bars for woven wire conveyor belts in which preseating of the spirals to reduce elongation of a belt is obtained.

And a still further object of the invention is to provide crimped connecting bars for woven wire conveyor belts that are tooth marked to control lateral movement of each spiral member whereby belts are adapted to be retained in longitudinal alignment.

With these and other objects and advantages in view, the invention embodies crimped connecting bars extended through alternately positioned coils of woven wire conveyor belts and other wire fabric in which the crimped portions are provided with tooth marks to correspond to the angle of the helical spiral or convolution of the coil thereby providing diagonal grooves in the crimped sections of the bars preventing the spiral members from wandering out of position on said crimped connecting wires and providing smoother hinging action resulting from the tooth marks of the crimped connecting bars lying in the path of motion of the spiral members, relative to the crimped connecting bars.

Other features and advantages of the invention will appear from the following description, taken in connection with the drawing, wherein:

Figure 1 is a plan view of a section of woven wire fabric, such as a conveyor belt showing the crimped connecting bars extended through spirals or coils thereof.

Figure 2 is a cross section through the belt taken on line 2—2 of Figure 1 with the parts shown on an enlarged scale.

Figure 3 is a similar cross section through the belt taken on line 3—3 of Figure 1 also showing the tooth marks in a connecting bar and also with the parts shown on an enlarged scale.

Figure 4 is a cross section taken on line 4—4 of Figure 3 illustrating the crimped connecting wires and showing the convolutions of the coils nested in the tooth marks of the connecting bars.

Figure 5 is a view showing a portion of one of the crimped connecting bars also showing the tooth marks in the bottom of the crimps and with parts broken away.

Figure 6 is a cross section through one of the crimped connecting wires taken on line 6—6 of Figure 5 illustrating one of the tooth marks and with the parts being shown on a still further enlarged scale.

Referring now to the drawing, wherein like reference characters denote corresponding parts, the improved offset crimped connecting bar for woven wire chain belts or the like includes a bar 10 crimped as shown in Figures 1, 4 and 5 forming wavy sections as indicated by the numeral 11 and with grooves 12 formed by tooth marks of teeth of gears with which the crimps are formed positioned in the bottoms 13 or short radius sides of the crimps.

The ends of the crimped bars 10 are secured to end coils or convolutions of spirals by being knuckled, bent over, or secured by other means, welded, or secured by other means as illustrated at the points 14 shown in Figures 1, 2 and 3, the end convolutions being indicated by the numerals 15 and 16 and the spirals or coils by the numerals 17 and 18.

With the connecting bars of the spirals or flat coils of a woven wire connected in this manner, coils of the fabric, such as the coils 17 and 18, are retained in meshing relation by the crimped rods with the convolutions of one coil, such as the coil 17, sloping in one direction, corresponding with the threads of a left-hand screw and with the convolutions of the coil 18 sloping in the opposite direction similar to the threads of a right-hand screw. With the convolutions meshing in this manner, particularly as illustrated in Figure 4, the tooth marks 12 or offset portions of the bars are positioned perpendicular to the coils of the spirals 17 in one set of crimps and perpendicular to the convolutions of the coils or spirals 18 in the alternate set of crimps.

By this means the vertexes of the coils are adapted to nest in the tooth marks in the bottoms of the crimps instead of riding upwardly on side surfaces of the crimps as in conventional woven wire chain belts.

With the meshing coils nested in the tooth marks in the bottoms of the crimped sections, conventional stretch or elongation of woven wire chain belts of from 3% to 5% is eliminated.

Furthermore, whereas straight crimped rods cause a chain conveyor belt to walk to one side or move laterally between head and tail pulleys, a chain with the vertexes of the coils nested in the tooth marks in the bottoms of the crimps travels continuously in a straight line.

With the stretch or elongation anticipated or preceded and with the coils and offset crimped bars formed to eliminate walking to the side or lateral movement, woven wire conveyor belts of this type may be permanently installed with tracks aligned with head and tail pulleys and with take-up devices eliminated or reduced to a minimum amount of travel.

The inner parts or surfaces 13 of the crimped sections of the bars are provided with shoulders 19 and 20 at the ends of the tooth marks 12, as illustrated particularly in Figure 5, the shoulders providing stops or limiting means preventing lateral movement of the coils on the connecting rods.

The size of the connecting wires or bars and also of the tooth marks and radii of the crimps may be varied according to the size of the wire used and also the pitch and spacing of the convolutions.

It will be understood that other modifications, within the scope of the appended claim, may be made in the design and arrangement of the parts without departing from the spirit of the invention.

What is claimed is:

A crimped bar for connecting meshing transversely disposed coils of woven wire conveyor belt, the alternate crimps of the bar being positioned to receive the arcuate ends of alternate convolutions of the coils, the bottoms or short radius surfaces of the crimps having transversely disposed grooves formed by tooth marks in the surfaces thereof, and the arcuate ends of the convolutions being nested in the said grooves of the bar.

References Cited in the file of this patent
UNITED STATES PATENTS

| | | |
|---|---|---|
| 1,939,002 | Durepo | Dec. 12, 1933 |
| 1,952,873 | King | Mar. 27, 1934 |
| 2,657,788 | Merrill | Nov. 3, 1953 |